United States Patent
Hann et al.

(10) Patent No.: US 7,756,165 B2
(45) Date of Patent: Jul. 13, 2010

(54) METHOD AND ARRANGEMENT FOR PRODUCING A TIME INTERVAL BETWEEN DATA FRAMES

(75) Inventors: Kenneth Hann, Espoo (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 347 days.

(21) Appl. No.: 11/898,839

(22) Filed: Sep. 17, 2007

(65) Prior Publication Data
US 2008/0069152 A1 Mar. 20, 2008

(30) Foreign Application Priority Data
Sep. 15, 2006 (FI) .................. 20060826

(51) Int. Cl.
*H04J 3/07* (2006.01)
(52) U.S. Cl. .................. 370/506; 370/412
(58) Field of Classification Search ........... None
See application file for complete search history.

(56) References Cited

U.S. PATENT DOCUMENTS

| | | | |
|---|---|---|---|
| 6,084,889 A * | 7/2000 | Murakami ........... | 370/474 |
| 6,137,798 A * | 10/2000 | Nishihara et al. ........... | 370/392 |
| 6,157,659 A * | 12/2000 | Bird ........... | 370/538 |
| 2007/0189315 A1* | 8/2007 | Aoyanagi ........... | 370/412 |

FOREIGN PATENT DOCUMENTS

| | | |
|---|---|---|
| EP | 1 317 110 A | 6/2003 |
| JP | 2005-184512 A | 7/2005 |
| KR | 2001-0055218 | 7/2001 |
| WO | 02/089427 A | 11/2002 |

OTHER PUBLICATIONS

Carson et al., "NIST Net—A Linux-Based Network Emulation Tool," Comp. Comm. Rev., www-x.antd.nist.gov/nistnet (Jun. 2003).
European Search Report in Corresponding Application EP 07115697 dated Nov. 27, 2009.

* cited by examiner

*Primary Examiner*—Phuc Tran
(74) *Attorney, Agent, or Firm*—Young & Thompson

(57) ABSTRACT

The invention relates to producing data traffic where the time intervals between successive data frames follow a predetermined probability distribution. In the present invention, it is surprisingly discovered that a time interval of a desired length between successive data frames can be produced by setting a certain bit quantity of digital stuffing data, defined on the basis of the target length of the time interval target, in a buffer memory (101), where successive data frames are waiting to be transmitted. The digital stuffing data is set in the buffer memory (101), so that the stuffing data is, in the read-out order, located between successive data frames.

26 Claims, 4 Drawing Sheets

METHOD AND ARRANGEMENT FOR PRODUCING A TIME INTERVAL BETWEEN DATA FRAMES

FIELD OF THE INVENTION

The invention relates to a method and arrangement for creating data traffic where the time intervals between successive data frames follow a pre-determined probability distribution.

BACKGROUND OF THE INVENTION

The task of testing data transmission systems has become more and more challenging as the versatility of data transmission systems and connected protocols and applications has increased. In order to be able to test the different functions of a data transmission system, it is necessary to be able to model the variation in the transmission delay caused by the data transmission network between various network elements, such as routers. Thus, it is necessary to set a desired probability distribution between the inter-packet intervals of successive data frames for the test traffic arriving in the network element.

The test traffic can be based for example on the data traffic measured in a real data transmission network. The measurement result can be represented for example as a file where there is recorded, in chronological order, the arrival time and size of each data frame that has arrived in the measurement location. In that case the measured size values and arrival times unambiguously define the size distribution of the data frames in the test traffic, as well as the distribution of time intervals between successive data frames. In a testing situation, the test traffic between the network elements to be tested is delayed by an adjustable delay element so that the time intervals between successive data frames are defined on the basis of values read from said file. Another generally known method for adjusting the delay of test traffic is to produce the values representing the time interval between successive data frames by using a random number generator and a pre-determined probability distribution. An apparatus that models the delay fluctuation in a data transmission network must process the test traffic so that the time intervals between successive data frames sent from said apparatus represent the desired distribution at a sufficient accuracy. The correctness of the time interval distribution is particularly important when testing for example the transmission of timing information over a data transmission network and the quality of Circuit Emulation Service, CES.

DESCRIPTION OF THE PRIOR ART

In an arrangement according to the prior art, the time intervals between data frames are defined by means of a processor-controlled timer. These kind of arrangements are described for example in the following publications: Carson, M., Santay, D., NIST Net—A Linux-based Network Emulation Tool, National Institute of Standards and Technology (NIST), (http://snad.ncsl.nist.gov/itg/nistnet/nistnet.pdf), and Hemminger, S., Network Emulation with NetEm, Open Source Development Lab, (http://developer.osdl.org/shemminger/LCA2005_paper.pdf). The resolution of the time intervals between data frames depends on the timing resolution of the device adjusting the timing. The timing resolution achieved by a typical personal computer is roughly 125 µs, i.e. the length of the time intervals can be adjusted roughly by steps of 125 µs. A denser timing resolution would require high clock frequencies and extremely powerful processors, in which case the apparatus modeling the delay fluctuation would become expensive.

In another arrangement according to the prior art, described in the publication JP2005184512, the apparatus modeling the delay fluctuation includes a selector switch, by means of which the data selected to be transmitted either consists of data frames representing test traffic, or digital stuffing data that is transmitted in between chronologically successive data frames. The length of a time interval in between successive data frames is defined by how long said selector switch is in a position where digital stuffing data is selected. The resolution of the delay time of the data frame depends on the timing resolution of the device controlling the operation of said selector switch. A denser timing resolution than the one achieved by a typical PC computer would require high clock frequencies and extremely powerful processors, in which case the apparatus modeling the delay fluctuation would become expensive.

SUMMARY OF THE INVENTION

The invention relates to an arrangement for producing a time interval of a desired length between successive data frames, so that the restrictions and drawbacks connected to the prior art can be eliminated or alleviated. The invention also relates to a method for producing a time interval of a desired length between successive data frames, so that the restrictions and drawbacks connected to the prior art can be eliminated or alleviated. The invention also relates to a computer program for guiding the arrangement processing data frames to produce a time interval of a desired length between successive data frames so that the restrictions and drawbacks connected to the prior art can be eliminated or alleviated. The invention also relates to a test traffic generator, where the restrictions and drawbacks connected to the prior art can be completely or partly avoided.

In the present invention, it is surprisingly discovered that a time interval with a desired length can be produced between successive data frames by placing the bit quantity of digital stuffing data defined on the basis of the target length of said time interval in a buffer memory, where said successive data frames are waiting to be transmitted. Said digital stuffing data is placed in said buffer memory so that the stuffing data is placed in between said successive data frames in the read-out order.

By means of the invention, there are achieved remarkable advantages:

By means of the invention, the length of a time interval between successive data frames can be adjusted even at the accuracy of one bit, without having to perform real-time start and end procedures of said time interval, for example when the transmission rate is 1 Gbit/s, the accuracy of one bit means a 1 ns resolution, in practical arrangements digital data is generally processed in eight bit bytes, but even in that case an 8 ns resolution is achieved by said 1 Gbit/s transmission rate.

An arrangement according to the invention for producing a time interval between a first data frame and a second data frame includes:

a memory device arranged to buffer digital data, containing said first data frame, said second data frame and digital stuffing data, and a reading unit arranged to read said digital data from said memory device in a chronological reading order defined by information connected to said digital data.

The arrangement according to the invention is characterized in that the arrangement also includes:
- a calculation unit that is arranged to define the bit quantity of said digital stuffing data on the basis of the target length of said time interval according to a pre-determined rule, and
- a write unit that is arranged to write said bit quantity of said digital stuffing data in said memory device so that said digital stuffing data is in said chronological reading order located as succeeding said first data frame and as preceding said second data frame.

wherein the pre-determined rule is one of the following three equations:

$$TB = St \times DP,$$

$$TB = St \times DP - V, \text{ and}$$

$$TB = St \times DP - F,$$

where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

A test traffic generator according to the invention is provided with a data frame generator that is arranged to produce data frames representing test traffic, and a target value generator that is arranged to produce target lengths for time intervals between successive data frames. The test traffic generator according to the invention is characterized in that the test traffic generator is also provided with an arrangement according to the invention for producing a time interval between a first data frame and a second data frame.

A method according to the invention for producing a time interval between a first data frame and a second data frame comprises buffering digital data that contains said first data frame, said second data frame, and digital stuffing data in a memory device. The method according to the invention is characterized in that the method further comprises:
- defining a bit quantity of said digital stuffing data on the basis of the target length of said time interval according to a pre-determined rule,
- writing said bit quantity of said digital stuffing data in said memory device, and
- reading, from said memory device, first in a chronological order said first data frame, secondly in the chronological order said digital stuffing data, and thirdly in the chronological order said second data frame.

wherein the pre-determined rule is one of the following three equations:

$$TB = St \times DP,$$

$$TB = St \times DP - V, \text{ and}$$

$$TB = St \times DP - F,$$

where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

A computer program according to the invention for guiding an arrangement processing data frames to produce a time interval between a first data frame and a second data frame, said arrangement including:
- a memory device arranged to buffer digital data that contains said first data frame, said second data frame and digital stuffing data, and
- a reading unit arranged to read said digital data from said memory device in a chronological reading order defined by information connected to said digital data, is characterized in that said computer program includes:
- program means for guiding said arrangement to define the bit quantity of said digital stuffing data on the basis of the target length of said time interval according to a pre-determined rule, and
- program means for guiding said arrangement to write said bit quantity of said digital stuffing data in said memory device, so that said digital stuffing data is in said chronological reading order located as succeeding said first data frame and as preceding said second data frame.

wherein the pre-determined rule is one of the following three equations:

$$TB = St \times DP,$$

$$TB = St \times DP - V, \text{ and}$$

$$TB = St \times DP - F,$$

where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

The various embodiments of the invention are characterized by what is set forth in the independent claims.

BRIEF DESCRIPTION OF THE DRAWINGS

The invention is described in more detail with reference to the appended drawings, where.

DETAILED DESCRIPTION OF THE EMBODIMENTS OF THE INVENTION

Figure 1:
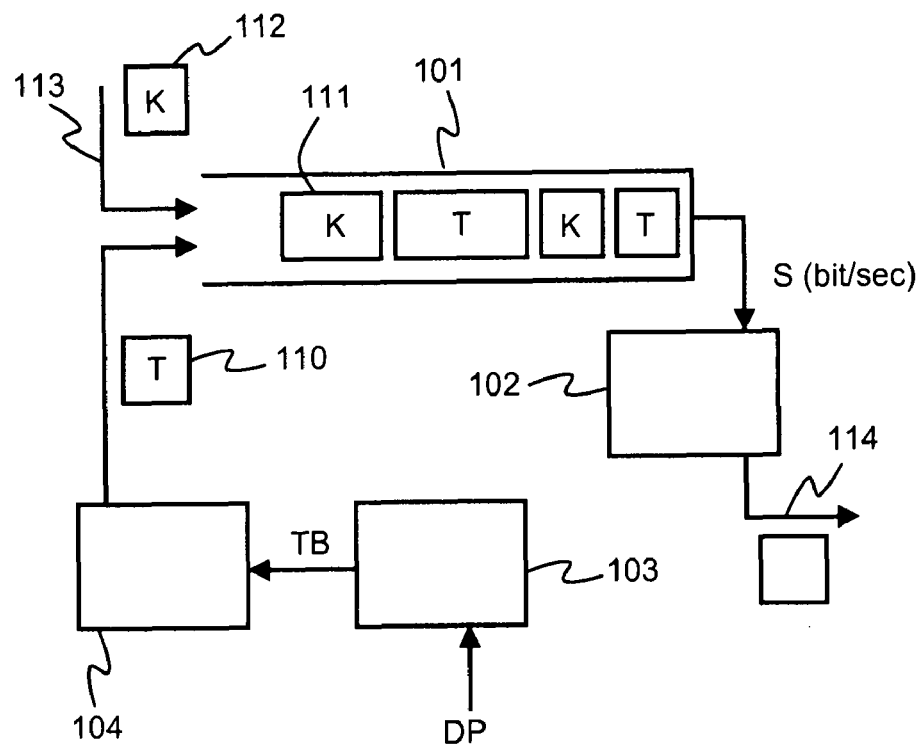
FIG. 1 illustrates an arrangement according to an embodiment of the invention for producing a time interval between successive data frames.

FIG. 1 illustrates an arrangement according to an embodiment of the invention for producing an inter-packet interval between successive data frames. The arrangement includes a memory device 101 arranged to buffer digital data comprising data frames K and digital stuffing data T. The arrangement includes a reading unit 102 arranged to read from the memory device 101 digital data in a chronological reading order defined by information connected to said digital data.

The arrangement includes a calculation unit 103 that is arranged to define the bit quantity TB of the digital stuffing data on the basis of the target length DP of said time interval according to a pre-determined rule. The target length DP can be a changing quantity, so that for instance the target length of the time interval between the successive data frames K1 and K2 is different than the target length of the time interval between the successive data frames K2 and K3. The arrangement includes a write unit 104 that is arranged to write a defined bit quantity TB of the digital stuffing data 110 in the memory device 101, so that the digital stuffing data 110 is in said chronological reading order placed between two successive data frames 111 and 112. The calculation unit 103 and the write unit 104 can be realized for example by one programmable processor. The arrow 113 illustrates the writing of the data frame 112 following the digital stuffing data 110 in the memory device. The arrow 114 illustrates the transmitting of the data frame or digital stuffing data read from the memory device 101 to outside the arrangement as an output from the arrangement.

The arrangement according to an embodiment of the invention illustrated in FIG. 1 is arranged to perform the writing in the memory device 101 and the reading therefrom according to the First In-First Out queuing discipline FIFO. Now the memory device 101 need not necessarily be a RAM memory device, in the memory locations of which it is possible to write and read in a random order. The memory device can also be for instance a stack memory circuit, in the memory locations of which there can be written and read only in a certain order. In an arrangement applying the FIFO queuing discipline, digital data is written in the memory device 101 in the same order as said digital data is read from the memory device 101. In other words, the digital stuffing data, the bit quantity of which defines the time interval between two successive data frames, is written in the memory device after writing the data frame to be transmitted earlier and before writing the data frame to be transmitted later. Now the chronological writing order of the digital data stored in the memory device 101 represents the information connected to said digital data that defines the chronological reading order of the reading unit 102 when reading said digital data.

In order to illustrate the operations, let us observe an exemplary situation where the reading rate of digital data from the memory device 101 is S (bits per second), and the target length of the time interval D(i) between two successive data frames K(i) and K(i+1) is DP(i) (seconds), where i is a sequential index (0, 1, 2, 3, . . . ) describing the chronological order of the data frames.

The calculation unit 102 defines the bit quantity TB(i) of the digital stuffing data T(i) used between the data frames K(i) and K(i+1) according to a pre-determined rule on the basis of the target length DP(i). The write unit 104 writes the digital stuffing data T(i) in the memory device 101 after the data frame K(i) is written in said memory device. Thus, for realizing the time interval D(i) between two successive data frames K(i) and K(i+1), there is no need to form real-time start and/or end indicators of said time interval D(i), but it suffices that the digital stuffing data T(i) is written in the memory device 101 before said time interval D(i) begins. The time interval, during which the digital stuffing data T(i) must be written in the memory device 101, is shortest in a situation where the data frame K(i) is started to be read from the memory device 101 immediately after said data frame is written in the memory device. In that case said time interval is the reading time of the data frame K(i), which is the bit quantity of the data frame K(i) divided by the reading rate S.

In an arrangement according to an embodiment of the invention, the calculation unit 103 is arranged to apply, as a pre-determined rule that defines the bit quantity TB(i) of the digital stuffing data between the data frames on the basis of the target length DP(i), the following equation:

$$TB(i)=St \times DP(i), \quad (1)$$

where St represents the data transmission rate (bits per second). The bit quantity TB(i) of the digital stuffing data, calculated on the basis of the equation (1), corresponds to a chronological delay DP(i) with a data transmission link where the data transmission rate is St. The reading rate S from the memory device 101 can be different than the data transmission rate St. The data transmission rate is different than the reading rate for example when in data frames representing a given protocol (for example the Internet Protocol), there is added, after reading from the memory device 101, header data from a lower protocol layer (for example Ethernet).

In an arrangement according to an embodiment of the invention, the calculation unit 103 is arranged to apply, as a pre-determined rule that defines the bit quantity TB(i) of the digital stuffing data on the basis of the target length DP(i) of the time interval between the data frames, the following equation:

$$TB(i)=St \times DP(i)-V, \quad (2)$$

where St represents the data transmission rate and V is a constant, by means of which there can be taken into account situations where in the data frame and/or stuffing data, there is after reading from the memory device 101 added pre and/or post appendices or fill-up bits, the time corresponding which fill-up material should be included in the time interval D(i) located between the successive data frames.

In an arrangement according to an embodiment of the invention, the calculation unit 103 is arranged to apply, as a pre-determined rule that defines the bit quantity TB(i) of the digital stuffing data on the basis of the target length DP(i) of the time interval between the data frames, the following equation:

$$TB(i)=St \times DP(i)-F, \quad (3)$$

where St represents the data transmission rate and F is a function, the value of which is defined on the basis of at least one of the following: the size of the data frame K(i) and the size of the data frame K(i+1) expressed in bits, bytes or some other quantities. By using the function F, it is easy to take into account situations where at least to one of the data frames K(i) or K(i+1) there is added, after reading from the memory device 101, such a quantity of fill-up bits depending on the frame size that the time corresponding to said fill-up bits should be included in the time interval between the successive data frames. This kind of situation is at hand for example when the data frame size has certain permitted values, and to the data frames there is added, after reading from the memory device 101, a required number of additional bits in order to make the data frame sizes correspond to the permitted values.

The equations (1), (2) and (3) can be applied for instance in a situation where the data frames read from the memory device 101 and the digital stuffing data are transmitted to a data transmission link, the data transmission rate of which is St. The equations (1), (2) and (3) can also be applied in a situation where the data frames read from the memory device 101 and the digital stuffing data are transmitted in serial form over the interface receiving digital data for example to a processor.

In an arrangement according to an embodiment of the invention, the calculation unit 103 is arranged to define the bit quantity TB(i) of the digital stuffing data, so that said bit quantity is an integral multiple of a pre-determined number M, i.e. TB(i)=k×M, where k is a non-negative integral. In an arrangement according to an embodiment of the invention M is eight.

In an arrangement according to an embodiment of the invention, the calculation unit 103 is arranged to define the bit quantity TB(i) of the digital stuffing data, so that said bit quantity is the largest integral multiple (k×M) of a pre-determined number M, which multiple is smaller than or equal to a value defined by a pre-determined equation. Said pre-determined equation can be for example the equation (1), (2) or (3).

In an arrangement according to an embodiment of the invention, the calculation unit 103 is arranged to define the bit quantity TB(i) of the digital stuffing data, so that said bit quantity is the smallest integral multiple (k×M) of a pre-determined number M, which multiple is larger than or equal to the value defined by a pre-determined equation.

In an arrangement according to an embodiment of the invention, the calculation unit 103 is arranged to define the bit quantity TB(i) of the digital stuffing data, so that said bit quantity is that integral multiple (k×M) of a pre-determined number M that is nearest to a value defined by a pre-determined equation.

In an arrangement according to an embodiment of the invention, the digital stuffing data T(i) read between the data frames K(i) and K(i+1) is composed of one data block that is treated as one entity in the data transmission protocol and that contains information fields such as the target address, the block size and the bit field indicating the start of a block.

In an arrangement according to an embodiment of the invention, the digital stuffing data T(i) read between the data frames K(i) and K(i+1) is composed of one or several data frame shaped data blocks, each of which is treated as one entity in the data transmission protocol.

In an arrangement according to an embodiment of the invention, the digital stuffing data T(i) read between the data frames K(i) and K(i+1) is composed of one or several equally large data blocks, each of which is treated as one entity in the data transmission protocol.

In an arrangement according to an embodiment of the invention, the digital stuffing data T(i) read between the data frames K(i) and K(i+1) is composed of at least two data blocks, each of which is treated as one entity in the data transmission protocol and at least two of which are mutually different in size.

In an arrangement according to an embodiment of the invention, the data frames are data packets according to the Ethernet protocol.

In an arrangement according to an embodiment of the invention, the data frames are data packets according to the Internet Protocol, IP.

In an arrangement according to an embodiment of the invention, the data frames are data cells according to the Asynchronous Transfer Mode protocol, ATM.

In an arrangement according to an embodiment of the invention, the calculation unit 103 is arranged to define the bit quantity TB(i) of the digital stuffing data, so that said bit quantity is k×n_ATM, where k is a non-negative integral and n_ATM is the size of the ATM data cell in bits.

In an arrangement according to an embodiment of the invention, the data frames are data frames according to the Frame Relay protocol.

Figure 2:
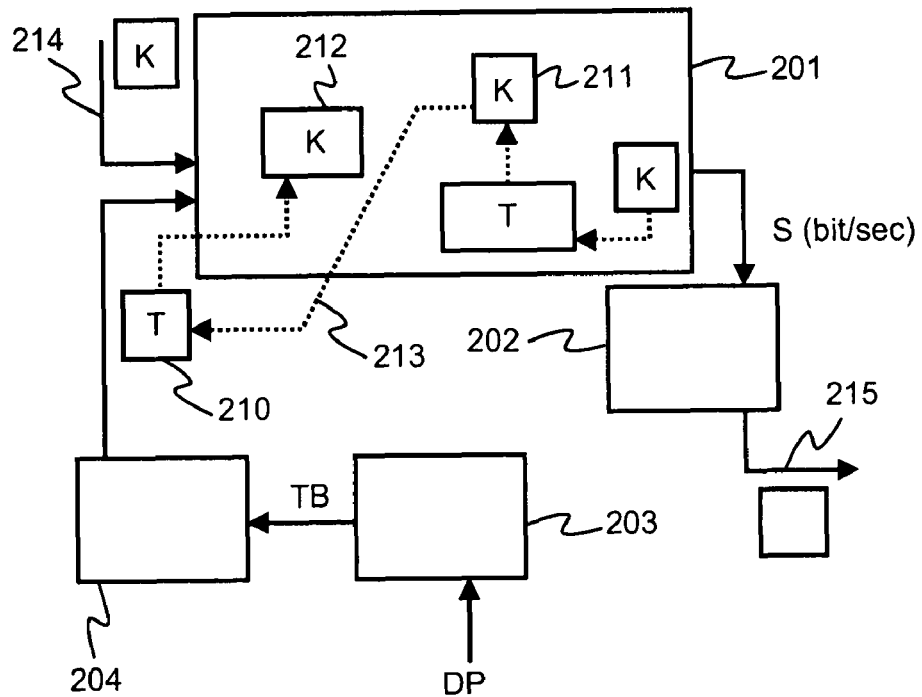
FIG. 2 illustrates an arrangement according to an embodiment of the invention for producing a time interval between successive data frames.

FIG. 2 illustrates an arrangement according to an embodiment of the invention for producing a time interval between successive data frames. The arrangement includes a memory device 201 that is arranged to buffer digital data that comprises data frames K and digital stuffing data T. The arrangement includes a reading unit 202 that is arranged to read from the memory device 201 digital data in the chronological reading order defined by the information connected to said digital data. The arrangement includes a calculation unit 203 that is arranged to define the bit quantity TB of the digital stuffing data on the basis of the target length DP of said time interval according to a pre-determined rule. The arrangement includes a write unit 204 that is arranged to write the defined bit quantity of digital stuffing data 210 in the memory device 201, so that the digital stuffing data 210 is in said chronological reading order located between two successive data frames 211 and 212. The dotted line arrows drawn in FIG. 2 illustrate this chronological order, so that the arrow points to the data frame K or digital stuffing data T to be read next. For example the dotted line arrow 213 illustrates that in the chronological reading order, the stuffing data 210 follows the data frame 211. The arrow 214 illustrates how the data frames are written in the memory device 201, and the arrow 215 illustrates how a data frame or digital stuffing data read from the memory device 201 is transmitted as an output to outside the arrangement.

In an arrangement according to the embodiment illustrated in FIG. 2, the arrangement includes data structure management means that enable the writing of digital data in the memory device 201 in an order that deviates from the above mentioned chronological reading order. The memory device 201 can be for instance a RAM circuit, in the memory locations of which there can be written and from the memory locations of which there can be read in a random order. In an arrangement according to this embodiment of the invention, the digital stuffing data 210 read in between reading the successive data frames 211 and 212 can be written in the memory device also in a case where both of said data frames 211 and 212 are already written in the memory device 201.

In an arrangement according to an embodiment of the invention, said data structure management means are arranged to organize the digital data recorded in the memory device 201 as a linked list, where each data frame K and each digital stuffing data T between the data frames is provided with address data that indicates the location of the stuffing data or data frame following said data frame or stuffing data in the chronological reading order in the address space of the memory device 201. Now the addresses connected to the data frames and the digital stuffing data between the data frames represent information that defines the chronological reading order followed by the reading unit 202.

In an arrangement according to an embodiment of the invention, said data structure management means are arranged to maintain and update an order list, where each element contains a data frame or such stuffing data address information that indicates the location of said data frame or stuffing data in the address space of the memory device 201, and an order value that indicates the position of said data frame or stuffing data in the chronological reading order followed by the reading unit 202. Said order list can be recorded in the memory device 201, or said order list can be recorded in another memory device. Said order list represents information that defines the chronological reading order followed by the reading unit 202.

Figure 3:
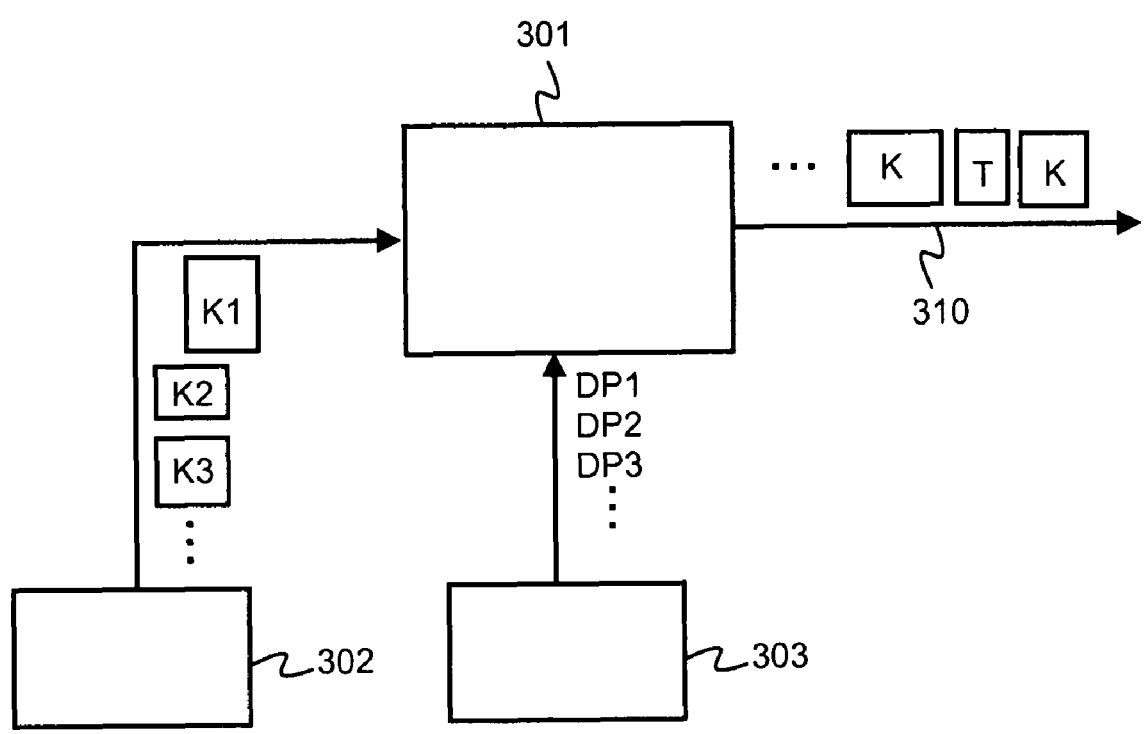
FIG. 3 illustrates a test traffic generator provided with an arrangement according to an embodiment of the invention for producing a time interval between successive data frames.

FIG. 3 illustrates a test traffic generator provided with an arrangement 301 according to an embodiment of the invention for producing a time interval between successive data frames. The arrangement 301 can be for instance an arrangement according to FIG. 1 or FIG. 2. The test traffic generator includes a data frame generator 302 that is arranged to produce data frames K1, K2, K3, . . . representing test traffic, and a target value generator 303 that is arranged to produce target lengths DP1, DP2, DP3, . . . of the time intervals between successive data frames. The size values of the data frames K1, K2, K3, . . . can be defined for example by reading the measurement results recorded in the file. The size values can also be formed by using a random number generator and a preselected probability distribution. Respectively, the target lengths DP1, DP2, DP3, . . . can be defined by reading the measurement results recorded in the file, or by using a random number generator and a preselected probability distribution. The arrow 310 illustrates the traffic flow formed by the data frames K transmitted from the test traffic generator and the digital stuffing data T.

Figure 4:
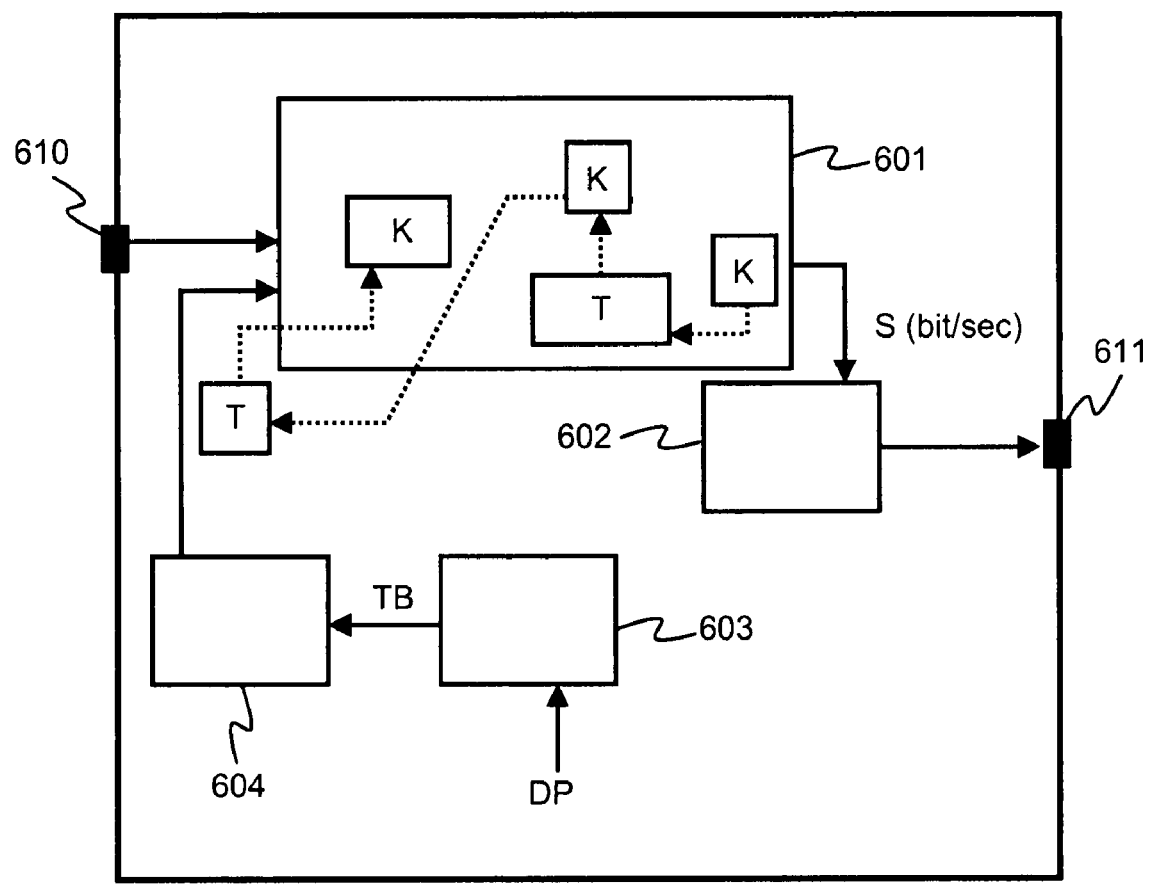
FIG. 4 illustrates an arrangement according to an embodiment of the invention for producing a time interval between successive data frames.

FIG. 4 illustrates an arrangement according to an embodiment of the invention for producing a time interval between successive data frames. The arrangement includes a memory device 601 that is arranged to buffer digital data that comprises data frames K and digital stuffing data T. Said data frames K are received through an input port 610. The arrangement includes a reading unit 602 that is arranged to read from the memory device 601 digital data to the output port 611 in the chronological reading order defined by the information connected to said digital data. The arrangement includes a calculation unit 603 that is arranged to define the bit quantity TB of the digital stuffing data according to a pre-determined rule, on the basis of the target length DP of said time interval. The arrangement includes a write unit 604 that is arranged to write the defined bit quantity of the digital stuffing data in the memory device 601, so that the digital stuffing data is in said chronological reading order located between successive data frames. In this arrangement, the test traffic contains digital stuffing data T in between data frames. The digital stuffing data can be given such a content that the network element receiving test traffic (not illustrated in FIG. 6) is capable of distinguishing the digital stuffing data T from the data frames K representing the test traffic proper. For instance, the stuffing data can be given such a target address value that the receiving network element drops said stuffing data at its input port.

Figure 5:
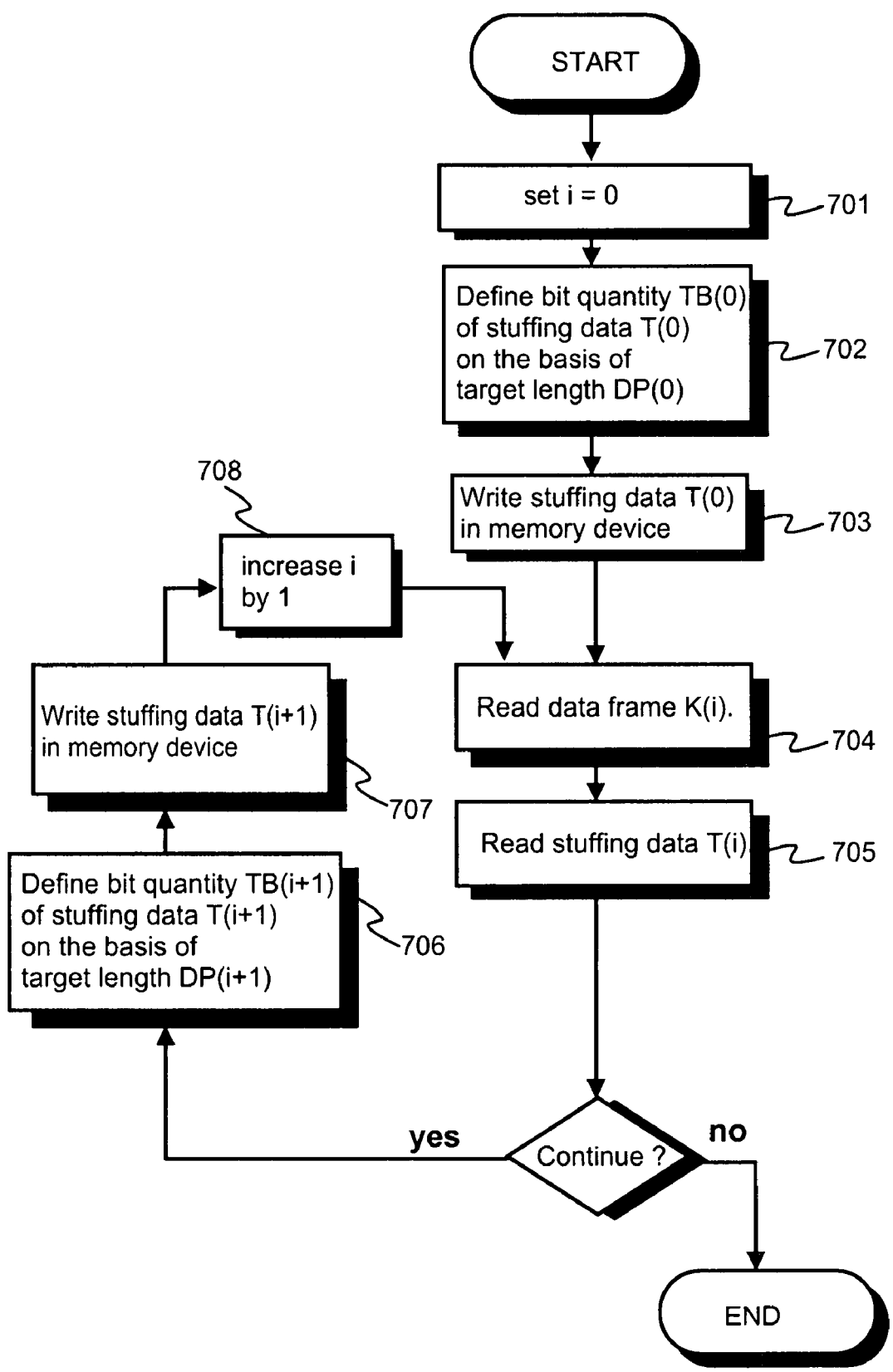
FIG. 5 is a flow diagram illustrating a method according to an embodiment of the invention for producing a time interval between successive data frames.

FIG. 5 is a flow diagram illustrating a method according to an embodiment of the invention for producing a time interval between successive data frames K(i) and K(i+1), where i is a sequential index 0, 1, 2, 3, . . . . In the method, digital data that comprises data frames and digital stuffing data is buffered in the memory device. In steps 701-703, the bit quantity TB(0) of the digital stuffing data T(0) between the data frames K(0) and K(1) is defined on the basis of the target length DP(0) of the desired time interval according to a pre-determined rule, and the digital stuffing data T(0) is written in said memory device. In step 704 (i=0), the data frame K(0) is read from said memory device, and in step 705 (i=0) the digital stuffing data T(0) is read from said memory device. In steps 706-707, the bit quantity TB(1) of the digital stuffing data T(1) between the data frames K(1) and K(2) is defined on the basis of the target length DP(1) of the desired time interval according to a predetermined rule, and the digital stuffing data T(1) is written in said memory device. In step 708, the value of the sequential index is increased by one, whereafter there follows step 704, where the data frame K(1) is read from said memory device. In step 705, the digital stuffing data T(1) is read from said memory device.

With respect to the time interval D(i+1) to be produced between two successive data frames K(i+1) and K(i+2), the operations proceed as follows:

In step 706, the bit quantity TB(i+1) of the digital stuffing data T(i+1) is defined on the basis of the target length DP of said time interval (i+1) according to a pre-determined rule, In step 707, said bit quantity of said digital stuffing data T(i+1) is written in said memory device, and In step 704, the data frame K(i+1) is read chronologically first from said memory device, in step 705 the digital stuffing data T(i+1) is read chronologically second from the memory device, and in step 704, the data frame K(i+2) i.e. K(i+1+1) is read chronologically third from the memory device.

The defining of the digital stuffing data T(i+2) in step 706, and the writing of the digital stuffing data T(i+2) in the memory device in step 707, are not connected to producing the time interval D(i+1), but they are connected to producing the next time interval D(i+2) between data frames.

In a method according to an embodiment of the invention, the writing in said memory device and the reading therefrom are carried out according to the First In-First Out queuing discipline, FIFO. No the writing of the digital stuffing data T(i) in said memory device is carried out after writing the data frame K(i) and before writing the data frame K(i+1).

In a method according to an embodiment of the invention, the writing of digital stuffing data T(i) in said memory device is carried out after writing both data frames K(i) and K(i+1).

In a method according to an embodiment of the invention, there is applied, as the pre-determined rule that determines the bit quantity TB(i) of the digital stuffing data on the basis of the target length DP(i) between the data frames, the following equation:

$$TB(i) = St \times DP(i), \quad (4)$$

where St represents the data transmission rate.

In a method according to an embodiment of the invention, there is applied, as the pre-determined rule that determines the bit quantity TB(i) of the digital stuffing data on the basis of the target length DP(i) of the time interval between data frames, the following equation:

$$TB(i) = St \times DP(i) - V, \quad (5)$$

where St represents the data transmission rate and V is a constant.

In a method according to an embodiment of the invention, there is applied, as the pre-determined rule that determines the bit quantity TB(i) of the digital stuffing data on the basis of the target length DP(i) of the time interval between data frames, the following equation:

$$TB(i) = St \times DP(i) - F, \quad (6)$$

where St represents the data transmission rate and F is a function, the value of which is defined on the basis of at least one the following: the size of the data frame K(i) and the size of the data frame K(i+1).

In a method according to an embodiment of the invention, the data frames are data packets according to the Ethernet protocol.

In a method according to an embodiment of the invention, the data frames are data packets according to the Internet Protocol IP.

In a method according to an embodiment of the invention, the data frames are data cells according to the Asynchronous Transfer Mode protocol ATM.

In a method according to an embodiment of the invention, the data frames are data frames according to the Frame Relay protocol.

In a method according to an embodiment of the invention, the digital data recorded in said memory device is organized as a linked list, where each data frame and the digital stuffing data between the data frames is provided with address data that indicates the location of the stuffing data or data frame following said data frame or stuffing data in the reading order in the address space of said memory device.

In a method according to an embodiment of the invention, there is maintained and updated an order list, where each element contains address data of a data frame or stuffing data that indicates the location of said data frame or stuffing data in the address space of said memory device, and an order value that indicates the position of said data frame or stuffing data in the reading order.

A computer program according to an embodiment of the invention for guiding an arrangement processing data frames to produce a time interval between a first data frame and a second data frame contains the following program means:

program means for guiding said apparatus to define the bit quantity of the digital stuffing data on the basis of the target length of said time interval according to a pre-determined rule, and program means for guiding said apparatus to write said bit quantity of said digital stuffing data in a memory device, so that said digital stuffing data is located in said memory device as succeeding to said first data frame in the reading order, and as preceding said second data frame.

Said program means can be for instance sub-programs or functions. Said apparatus can be for instance an arrangement illustrated in FIG. 1, where the calculation unit 103 and the write unit 104 are realized by one or several programmable processors.

A computer program according to an embodiment of the invention is recorded in a recording device readable by the processing unit, such as an optical disk (CD-disk, Compact Disk).

A computer program according to an embodiment of the invention is coded in a signal that can be received from a data transmission network such as the Internet.

As is apparent for a man skilled in the art, the invention and its various embodiments are not restricted to the above described embodiments, but the invention and its embodiments can be modified within the scope of the independent claim.

What is claimed is:

1. An arrangement for producing a time interval between a first data frame and a second data frame, said arrangement including:

a memory device arranged to buffer digital data that contains said first data frame, said second data frame, and digital stuffing data, a reading unit arranged to read said digital data from said memory device in a chronological reading order defined by information connected to said digital data, a calculation unit that is arranged to define a bit quantity of said digital stuffing data on the basis of a target length of said time interval according to a pre-determined rule, and a write unit that is arranged to write said bit quantity of said digital stuffing data in said memory device, so that said digital stuffing data is in said chronological reading order located as succeeding said first data frame and as preceding said second data frame, wherein the pre-determined rule is one of the following three equations:

$TB=St \times DP$, $TB=St \times DP-V$, and $TB=St \times DP-F$, where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

2. An arrangement according to claim 1, wherein the arrangement is arranged to perform the writing in said memory device and the reading therefrom according to the First In-First Out queuing discipline FIFO.

3. An arrangement according to claim 1, wherein the write unit is arranged to write said digital data in said memory device in an order deviating from said chronological reading order.

4. An arrangement according to claim 3, wherein the write unit is arranged to organize said digital data in a linked list, where said first data frame is provided with first address data that indicates the location of said digital stuffing data in the address space of said memory device, and where said digital stuffing data is provided with second address data that indicates the location of said second data frame in the address space of said memory device.

5. An arrangement according to claim 3, wherein the write unit is arranged to maintain and update an order list, the first element whereof indicates the location of said first data frame in the address space of said memory device, and the position of said first data frame in said chronological reading order, and the second element whereof indicates the location of said digital stuffing data in the address space of said memory device and the position of said digital stuffing data in said chronological reading order, and the third element whereof indicates the location of said second data frame in the address space of said memory device and the position of said second data frame in said chronological reading order.

6. An arrangement according to claim 1, wherein the pre-determined rule is the equation:

$TB=St \times DP$.

7. An arrangement according to claim 1, wherein the pre-determined rule is the equation:

$TB=St \times DP-V$.

8. An arrangement according to claim 1, wherein the pre-determined rule is the equation:

$TB=St \times DP-F$.

9. An arrangement according to claim 1, wherein said first data frame and said second data frame are data packets according to the Ethernet protocol.

10. An arrangement according to claim 1, wherein said first data frame and said second data frame are data packets according to the Internet Protocol IP.

11. An arrangement according to claim 1, wherein said first data frame and said second data frame are data cells according to the Asynchronous Transfer Mode protocol ATM.

12. An arrangement according to claim 1, wherein said first data frame and said second data frame are data frames according to the Frame Relay protocol.

13. A test traffic generator, including:

a data frame generator arranged to produce a first data frame and a second data frame representing test traffic, a target value generator arranged to produce a target length of a time interval between said first data frame and said second data frame, a memory device arranged to buffer digital data that contains said first data frame, said second data frame, and digital stuffing data, a reading unit arranged to read said digital data from said memory device in a chronological reading order defined by information connected to said digital data, a calculation unit that is arranged to define a bit quantity of said digital stuffing data on the basis of a target length of said time interval according to a pre-determined rule, and a write unit that is arranged to write said bit quantity of said digital stuffing data in said memory device, so that said digital stuffing data is in said chronological reading order located as succeeding said first data frame and as preceding said second data frame, wherein the pre-determined rule is one of the following three equations:

$$TB = St \times DP,$$

$$TB = St \times DP - V, \text{ and}$$

$$TB = St \times DP - F,$$

where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

14. A method for producing a time interval between a first data frame and a second data frame, in which method digital data that contains said first data frame, said second data frame, and digital stuffing data is buffered in a memory device, the method further comprising:

defining a bit quantity of said digital stuffing data on the basis of a target length of said time interval according to a pre-determined rule, writing the bit quantity of said digital stuffing data in said memory device, and reading, from said memory device, first in a chronological order said first data frame, second in the chronological order said digital stuffing data, and third in the chronological order said second data frame, wherein the pre-determined rule is one of the following three equations:

$$TB = St \times DP,$$

$$TB = St \times DP - V, \text{ and}$$

$$TB = St \times DP - F,$$

where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

15. A method according to claim 14, wherein the writing in said memory device and the reading therefrom are carried out according to the First In-First Out queuing discipline.

16. A method according to claim 14, wherein said digital stuffing data is written in said memory device after said first data frame and said second data frame are written in said memory device.

17. A method according to claim 14, wherein the pre-determined rule is the equation:

$$TB = St \times DP.$$

18. A method according to claim 14, wherein the pre-determined rule it the equation:

$$TB = St \times DP - V.$$

19. A method according to claim 14, wherein the pre-determined rule is the equation:

$$TB = St \times DP - F.$$

20. A method according to claim 14, wherein said first data frame and said second data frame are data packets according to the Ethernet protocol.

21. A method according to claim 14, wherein said first data frame and said second data frame are data packets according to the Internet Protocol IP.

22. A method according to claim 14, wherein said first data frame and said second data frame are data cells according to the Asynchronous Transfer Mode protocol ATM.

23. A method according to claim 14, wherein said first data frame and said second data frame are data frames according to the Frame Relay protocol.

24. A method according to claim 14, wherein said first data frame is provided with first address data that indicates the location of said digital stuffing data in the address space of said memory device, and said digital stuffing data is provided with second address data that indicates the location of said second data frame in the address space of said memory device.

25. A method according to claim 14, comprising maintaining and updating an order list, the first element of which contains first address data and a first order value, the second element contains second address data and a second order value, and the third element contains third address data and a third order value, of which the first address data indicates the location of said first data frame in the address space of said memory device, the second address data indicates the location of said digital stuffing data in the address space of said memory device, the third address data indicates the location of said second data frame in the address space of said memory device, and that said first, second and third order values determine that said first data frame is read from said memory device prior to said digital stuffing data, and that said digital stuffing data is read from said memory device prior to said second data frame.

26. A non-transitory computer readable medium storing an executable program for guiding an apparatus processing data frames to produce a time interval between a first data frame and a second data frame, said apparatus including:

a memory device that is arranged to buffer digital data that contains said first data frame, said second data frame, and digital stuffing data, and a reading unit that is arranged to read said digital data from said memory device in a chronological reading order defined by information connected to said digital data, wherein the executable program is configured to cause said apparatus:

to define a bit quantity of said digital stuffing data on the basis of a target length of said time interval according to a pre-determined rule, and to write said bit quantity of said digital stuffing data in said memory device, so that said digital stuffing data is in said chronological reading order located as succeeding to said first data frame and as preceding said second data frame, wherein the pre-determined rule is one of the following three equations:

$$TB = St \times DP,$$

$$TB = St \times DP - V, \text{ and}$$

$$TB = St \times DP - F,$$

where TB is the bit quantity of said digital stuffing data, St is a data transmission rate, DP is the target length of said time interval, V is a pre-determined constant, and F is a pre-determined function, the value of which is defined on the basis of at least one of the following: a size of said first data frame and a size of said second data frame.

* * * * *